(12) United States Patent
Takefman et al.

(10) Patent No.: US 8,615,599 B1
(45) Date of Patent: Dec. 24, 2013

(54) METHOD AND APPARATUS FOR PREVENTING LOOPS IN A NETWORK BY CONTROLLING BROADCASTS

(75) Inventors: Michael Takefman, Nepean (CA);
Jimmy P. Ervin, Raleigh, NC (US);
James S. Alexander, Raleigh, NC (US);
Parveen Bhagwatula, Cary, NC (US);
Steven J. Faulkner, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 1769 days.

(21) Appl. No.: 11/278,314

(22) Filed: Mar. 31, 2006

(51) Int. Cl.
*G06F 15/16* (2006.01)
*G06F 15/173* (2006.01)

(52) U.S. Cl.
USPC ............................ 709/236; 709/249; 709/251

(58) Field of Classification Search
USPC ......................................................... 709/236
See application file for complete search history.

(56) References Cited

U.S. PATENT DOCUMENTS

| | | | |
|---|---|---|---|
| 6,781,953 B1 * | 8/2004 | Naouri | 370/218 |
| 7,532,594 B2 * | 5/2009 | Lin et al. | 370/329 |
| 7,623,446 B1 * | 11/2009 | Allan et al. | 370/223 |
| 7,672,228 B1 * | 3/2010 | Senevirathne et al. | 370/219 |
| 7,706,258 B2 * | 4/2010 | Elie-Dit-Cosaque et al. | 370/224 |
| 7,710,961 B2 * | 5/2010 | Miller et al. | 370/390 |
| 7,720,055 B2 * | 5/2010 | Kadambi et al. | 370/389 |
| 7,734,745 B2 * | 6/2010 | Gloe | 709/223 |
| 7,796,612 B2 * | 9/2010 | Sampath et al. | 370/395.53 |
| 7,801,158 B2 * | 9/2010 | Voit et al. | 370/401 |
| 7,801,857 B2 * | 9/2010 | Betts et al. | 707/628 |
| 7,852,831 B2 * | 12/2010 | Akbar | 370/352 |
| 2003/0012129 A1 * | 1/2003 | Lee et al. | 370/216 |
| 2005/0005187 A1 * | 1/2005 | Shah | 714/1 |
| 2005/0243845 A1 * | 11/2005 | Higashitaniguchi et al. | 370/404 |
| 2005/0259646 A1 * | 11/2005 | Smith et al. | 370/389 |
| 2006/0209859 A1 * | 9/2006 | Mutoh et al. | 370/404 |
| 2006/0215546 A1 * | 9/2006 | Tochio | 370/218 |
| 2006/0245376 A1 * | 11/2006 | Ge et al. | 370/256 |
| 2006/0269282 A1 * | 11/2006 | Gerstel | 398/19 |
| 2007/0159983 A1 * | 7/2007 | Eglin et al. | 370/254 |
| 2009/0040922 A1 * | 2/2009 | Umansky et al. | 370/224 |

* cited by examiner

*Primary Examiner* — Melvin H Pollack

(57) ABSTRACT

Methods and apparatus for eliminating loops associated with interconnects between clusters are disclosed. According to one aspect of the present invention, a method for operating a cluster of an interconnect group that includes at least one node and is in communication with a plurality of interconnects includes broadcasting a first frame on the interconnects. The method also includes receiving a second frame, the second frame being received on only a first interconnect, and blocking the second frame from being broadcast on the first interconnect. Finally, the method includes broadcasting the received second frame throughout the cluster such that no node in the cluster receives more than one copy of the second frame.

22 Claims, 12 Drawing Sheets

METHOD AND APPARATUS FOR PREVENTING LOOPS IN A NETWORK BY CONTROLLING BROADCASTS

BACKGROUND OF THE INVENTION

1. Field of Invention

The present invention relates generally to communication networks. More particularly, the present invention relates to methods of fault protection in communication networks.

2. Description of the Related Art

Various network topologies utilize rings. Resilient Packet Ring (RPR) is an example of a network topology for fiber optic rings. The Institute of Electrical and Electronic Engineers (IEEE) defines RPR standards in IEEE 802.17, which is incorporated herein by reference in its entirety. RPR is a layer two ring technology in a networking framework defined by the Open Systems Interconnection (OSI) model, and supports bi-directional communications around both sides of a ring using redundant paths substantially simultaneously. At layer two, or a data link layer, data packets are encoded and decoded into bits. Layer two is divided into two sublayers, a Media Access Control (MAC) layer and a Logical Link Control (LLC) layer. The MAC sublayer is arranged to substantially control how a node of a network accesses and transmits data, while the LLC layer generally controls frame synchronization, controls flow control, and provides error checking.

RPR generally treats a ring as a broadcast medium, and does not specify a higher level loop prevention mechanism. When two rings are in communication over interconnects, looping may occur. FIG. 1A is a diagrammatic representation of two RPR clusters that are in communication over a set of interconnects. A first RPR cluster 110a and a second RPR cluster 110b are in communication over interconnects 114a-d. More than one interconnect 114a-d is typically present between first RPR cluster 110a and second RPR cluster 110b to avoid a single point of failure.

When first RPR cluster 110a and second RPR cluster 110b choose the same interconnect, i.e., interconnect 114c as shown in FIG. 1B, to use for communications, then looping is not likely to occur. However, when first RPR cluster 110a and second RPR cluster 110b select different interconnects 114a-d to communicate over, looping may occur. FIG. 1C is a diagrammatic representation of first RPR cluster 110a that sends messages to second RPR cluster 110b over interconnect 114d and second RPR cluster 110b sending messages to first RPR cluster 110a over interconnect 114b. Looping may occur, as when first RPR cluster 110a receives a message for broadcast on interconnect 114b, first RPR cluster 110a may broadcast the message back to second RPR cluster 110b on interconnect 114d. Such looping may flood interconnects 114b, 114d, and degrade the performance of interconnects 114b, 114d, as well as of first RPR cluster 110a and second RPR cluster 110b. Looping may also result in the replication of frames contained in messages when a frame broadcast on interconnect 114b is returned on interconnect 114d.

Looping will be described in more detail with respect to FIG. 2. Multiple active paths between rings often cause loops in between the rings. When a loop is in existence in a network, duplication of messages may occur, as some nodes effectively receive messages from different sides. By way of example, when a node is a bridge, looping results in the bridge receiving a message on both sides of the bridge. As a result, a message forwarding algorithm of the bridge may become confused, and duplicate frames may be forwarded.

FIG. 2 is a diagrammatic representation of a network which includes nodes arranged in two rings, i.e., a bridged RPR network with a dual ring interconnect. A first ring includes nodes 206a-h, and a second ring includes nodes 216a-h. When a customer 202 wishes to send a message on layer two, as for example a message that is arranged as a plurality of frames, to another customer 220, the message is propagated through the first ring and the second ring. As the rings are linked by interconnects 210, 212, the message may loop through nodes 206a-h. Once the message reaches nodes 206c, 206g, the message is sent on interconnects 212, 210, respectively, to nodes 216c, 216g, respectively. Both node 216c and node 216g propagate the message through the second ring and, eventually, to customer 220 through node 216e.

However, when the version of the message received on node 216c via interconnect 212 is forwarded to node 216g, node 216g may forward that version of the message through interconnect 210 back to node 206g. Similarly, when the version of the message received on node 216g via interconnect 210 is forwarded to node 216c, node 216c may forward that version of the message through interconnect 212 back to node 206c. Hence, the message is effectively looped between the first ring and the second ring.

A spanning tree protocol may be used in some instances to effectively guarantee a loop-free network. To avoid path redundancy, a spanning tree protocol defines a tree that spans all nodes in a network. A spanning tree protocol effectively causes some redundant interconnects to be blocked. If one unblocked interconnect fails or otherwise becomes unavailable, a spanning tree algorithm reconfigures the network topology by unblocking a blocked path. However, a spanning tree protocol is relatively slow in recovering from a fault. In other words, once a fault is discovered, although a spanning tree protocol may be effective in reconfiguring a system, the reconfiguration process is relatively slow. The performance of the system may be compromised by a slow recover reconfiguration or recover process.

Though a rapid spanning tree protocol, which is implemented in some networks to guarantee a loop-free network, generally provides a faster reconfiguration process than a spanning tree protocol, a rapid spanning tree protocol does not provide rapid reconfiguration in a ring. Hence, a rapid spanning tree protocol may not be used to ensure that connectivity between rings is restored after a fault occurs.

Therefore, what is needed is a method and an apparatus for allowing a network that includes rings to operate without loops and to be relatively rapidly reconfigured in the event of a failure of an interconnect between the rings. That is, what is desired is a system that prevents loops from forming between rings, and that ensures a relatively efficient restoration of connectivity between the rings in the event of a failure.

BRIEF DESCRIPTION OF THE DRAWINGS

The invention may best be understood by reference to the following description taken in conjunction with the accompanying drawings in which.

DETAILED DESCRIPTION

To provide fast recovery of network faults, multiple communication paths are provided for every possible communication to effectively ensure that the failure of a single underlying communication path or device does not cause the failure of the communication to propagate through the entire network. Establishing multiple communication paths, or interconnects, betweens areas of a network, e.g., clusters, creates communication loops. Communication loops may cause communication to propagate multiple times through the same devices or communication paths, resulting in the duplication of communication messages and crippling use of bandwidth.

In one embodiment, a network that is partitioned into a plurality of clusters, as for example rings of a Resilient Packet Ring (RPR) network, uses substantially all interconnects for communication without allowing communication loops, while supporting a relatively rapid recovery of all communication paths in the event of failure of an interconnect. A parent cluster is defined to broadcast messages on substantially all available interconnects between the parent cluster and an associated child cluster. The child cluster is defined to have multiple subclusters, each of which is associated with an interconnect. Looping may be prevented, as the child cluster broadcasts messages to the parent cluster on only one interconnect at any given time. Hence, configuring the parent cluster to identify that a message is received on a given interconnect may prevent the subcluster that originated the message from having the message looped back to it by the parent cluster. Typically, topology information does not need to be communicated between the parent cluster and the child cluster.

Loops may be prevented between a pair of clusters by sending communications on one or more interconnects between the clusters and essentially ensuring that the same communication does not return back on any of the interconnects. If a communication is sent over more than one interconnect, duplication of the communication in the destination cluster may be avoided by limiting the scoping of allowed destinations for each interconnect in the destination cluster.

Figure 1A:
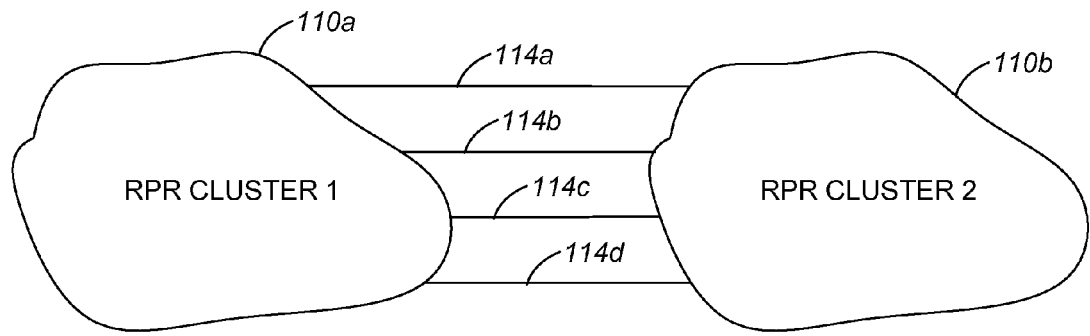
FIG. 1A is a diagrammatic representation of a network in which a first resilient packet ring (RPR) cluster is interconnected with a second RPR cluster using multiple interconnecting links.
Figure 1B:
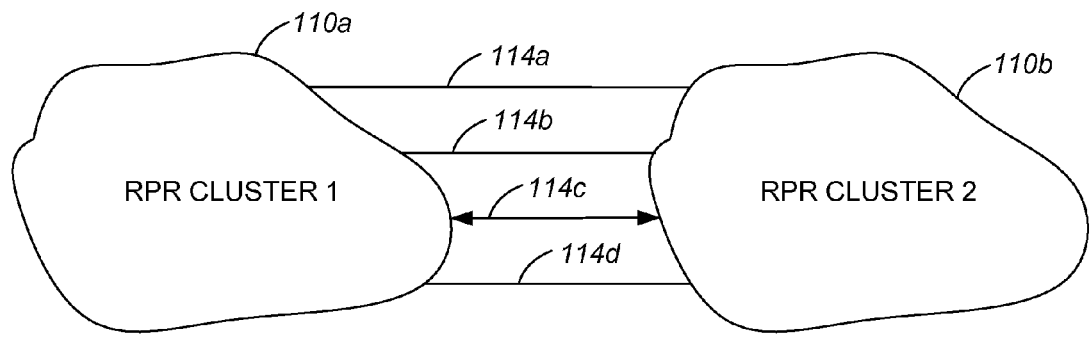
FIG. 1B is a diagrammatic representation of a first RPR cluster and a second RPR cluster, i.e., first RPR cluster 110a and second RPR cluster 110b of FIG. 1A, communicating bi-directionally over a single link.
Figure 1C:
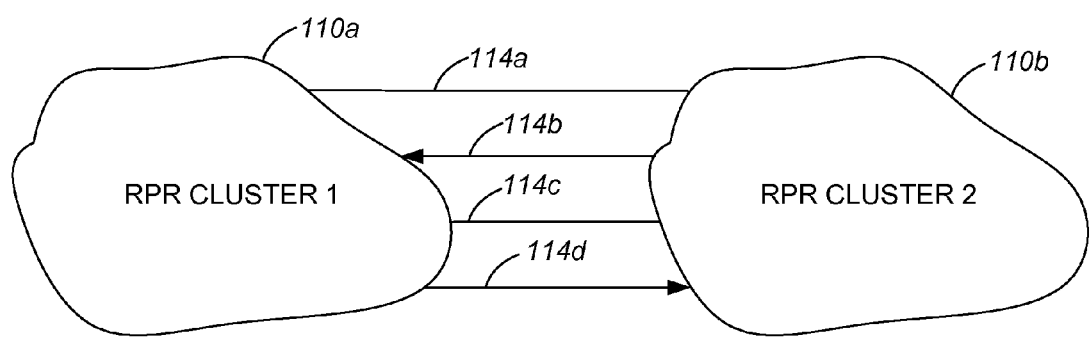
FIG. 1C is a diagrammatic representation of a first RPR cluster and a second RPR cluster, i.e., first RPR cluster 110a and second RPR cluster 110b of FIG. 1A, communicating over a plurality of links.
Figure 2:
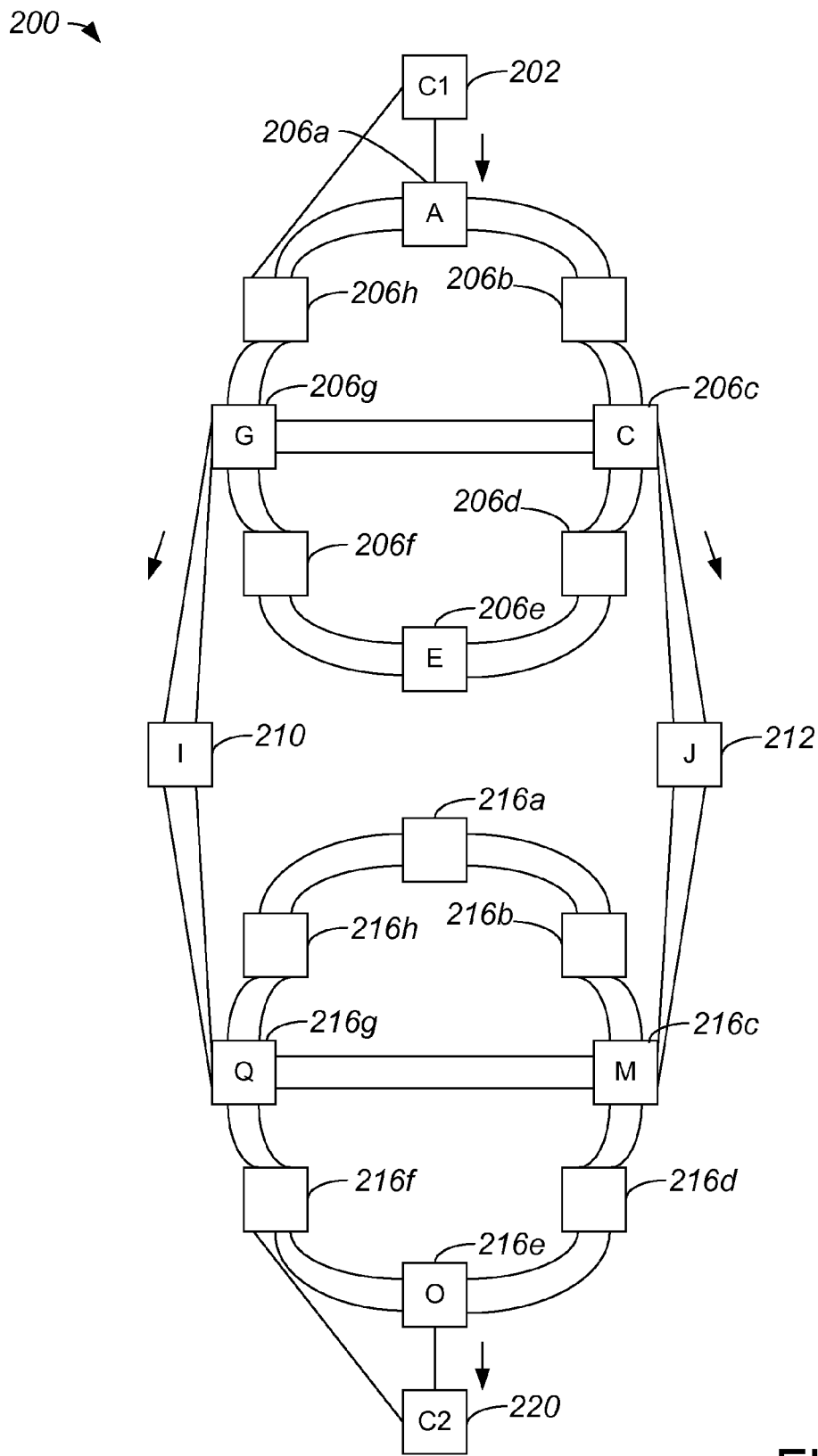
FIG. 2 is a diagrammatic representation of a plurality of clusters in between which loops may occur.
Figure 3A:
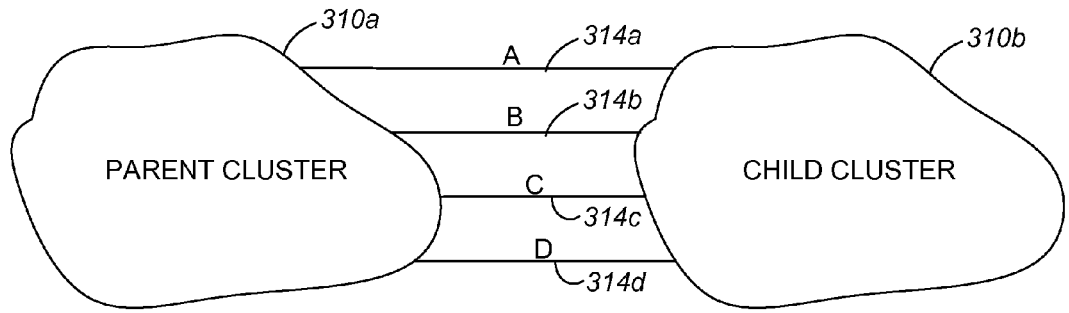
FIG. 3A is a diagrammatic representation of a parent cluster and a child cluster which are in communication over multiple interconnecting links in accordance with an embodiment of the present invention.

Referring next to FIG. 3A, a parent cluster and a child cluster will be described in accordance with an embodiment of the present invention. Within a network 300, e.g., a cluster interconnect group, clusters 310a, 310b, which may be rings, are in communication across multiple interconnects 314a-d. In general, clusters 310a, 310b each include of multiple nodes which are able communicate bi-directionally within clusters 310a, 310b. By way of example, each node or device in a cluster 310a is arranged to communicate bi-directionally with every other node or device in cluster 310a. The bi-directional communication may be achieved through any suitable broadcast connection. Suitable broadcast connections include, but are not limited to, shared physical media, e.g., a shared Ethernet segment or wireless broadcast area, and a logical broadcast domain created using encapsulation such as an Institute of Electrical and Electronic Engineers (IEEE) 802.17 compliant ring or a multi-point to multi-point tunnel. Bi-directional communication within clusters 310a, 310b may also utilize connection forwarding, replication, and filtering that allows for the creation of logical broadcast domains overlaid on a form of a connection network. It should be appreciated that in addition to broadcast communication, unicast communication may also occur inside clusters 310a, 310b.

Interconnects 314a-d are communication paths between devices in clusters 310a, 310b, and are typically point-to-point connections that support bi-directional communication. In other words, each interconnect 314a-d is arranged between a device in cluster 310a and a device in cluster 310b, and may carry both broadcast and unicast communication. Generally, each interconnect 314a-d is arranged between a different pair of devices. Interconnects 314a-d may be physical links such as Ethernet links. Alternatively, interconnects 314a-d may be logical communication paths over media, or essentially conceptual communication paths that are internal to a device which is a member of both clusters 310a, 310b.

In the described embodiment, cluster 310a is a parent cluster and cluster 310b is a child cluster 310b. That is, the hierarchical relationship between clusters 310a, 310b is such that cluster 310a is a parent and cluster 310b is a child. Within parent cluster 310a, nodes are configured, as for example by a network administrator, to support interconnects 314a-d as being associated with a parent. Within child cluster 310b, nodes are configured to support interconnects 314a-d as being associated with a child. Further, child cluster 310b is divided into subclusters, or cluster subsets, that are each associated with an interconnect 314a-d, as will be described with respect to FIG. 3B.

Figure 3B:
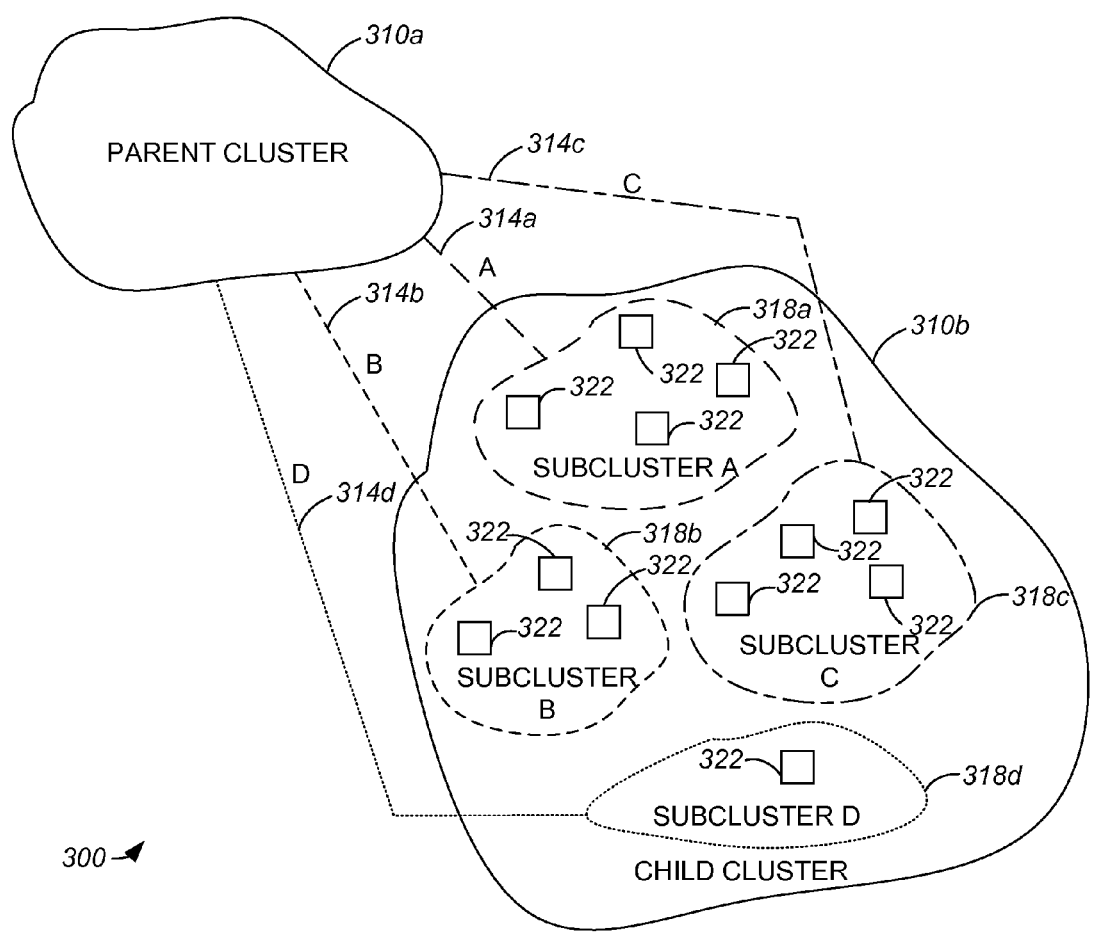
FIG. 3B is a diagrammatic representation of a parent cluster, i.e., parent cluster 310a of FIG. 3A, in communication with a plurality of subclusters of a child cluster, i.e., child cluster 310b of FIG. 3A, over multiple interconnecting links in accordance with an embodiment of the present invention.

FIG. 3B is a diagrammatic representation of parent cluster 310a interconnected with child cluster 310b which is divided into subclusters in accordance with an embodiment of the present invention. Child cluster 310b is divided or partitioned into subclusters 318a-d. Although approximately four subclusters 318a-d are shown, it should be appreciated that another number of subclusters 318a-d may generally be included in child cluster 310b. A subcluster 318a-d may include all nodes 322 of child cluster 310b, no nodes 322, or some nodes 322. Subclusters 318a-d are defined such that all nodes 322 are encompassed, i.e., all nodes 322 are accounted for as a part of a subcluster 318a-d. Nodes 322 are such that any given node 322 is included in only one subcluster 318a-d. It should be appreciated that a subcluster 318a-d may include no nodes if an associated interconnect 314a-d is faulty or otherwise offline.

Each interconnect 314a-d is associated with a subcluster 318a-d. As shown, interconnect 314a is associated with subcluster 318a, interconnect 314b is associated with subcluster 318b, interconnect 314c is associated with subcluster 318c, and interconnect 314d is associated with subcluster 318d. Generally, subclusters 318a-d may be dynamically allocated to interconnects 314a-d such that a high level of performance may be achieved. The allocation of nodes 322 within subclusters 318a-d, or the determination of subclusters 318a-d, will be described below with respect to FIGS. 8A and 8B.

Figure 3C:
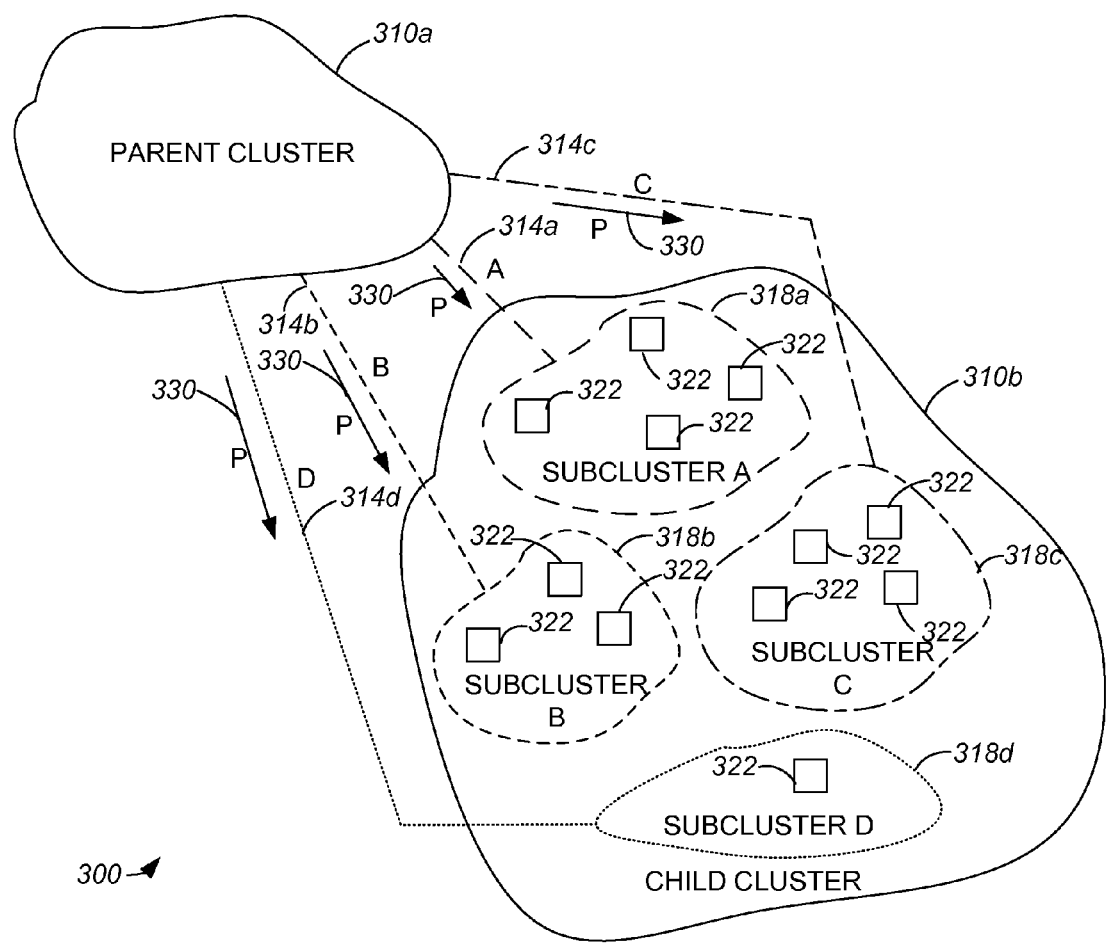
FIG. 3C is a diagrammatic representation of a parent cluster, i.e., parent cluster 310a of FIGS. 3A and 3B, broadcasting a message to a plurality of subclusters of a child cluster, i.e., child cluster 310b of FIGS. 3A and 3B, over multiple interconnecting links in accordance with an embodiment of the present invention.

When parent cluster 310a broadcasts a message to child cluster 310b, the message is broadcast on all interconnects 314a-d. As shown in FIG. 3C, a message 330 that is broadcast by parent cluster 310a is sent on all interconnects 314a-d to child cluster 310b. Although not shown, it should be understood that when parent cluster 310a unicasts a message to a particular node 322 in child cluster 310b, the unicast message may be sent on the appropriate interconnect 314a-d to the subcluster 318a-d in which node 322 is resident.

Interconnects 314a-d generally have the ability to support a subcluster broadcast to all nodes 322 in an associated subcluster 318a-d, respectively. While each interconnect 314a-d is configured to support a single subcluster 318a-d, respectively, at any given time, it should be understood that the subcluster 318a-d to which an interconnect 314a-d may change, e.g., when one interconnect 314a-d fails and thereby causes subclusters 318a-d to be redefined. That is, each interconnect 314a-d may be arranged to be associated with any subcluster 318a-d. Each interconnect 314a-d may, in one embodiment, support the ability to broadcast to substantially only nodes 322 included in its associated subcluster 318a-d, respectively, for some communications and to broadcast other communications to all nodes 322 in child cluster 310b.

To prevent looping from occurring, when subclusters 318a-d or, more specifically, nodes 322 within subclusters 318a-d communicate messages to parent cluster 310a, e.g., through unicast or broadcast, the messages are communicated substantially only on the interconnect 314a-d which is associated with the subcluster 318a-d originating the communication within child cluster 310b. By way of example, when subcluster 318a broadcasts a message, the message is broadcast to substantially all subclusters 318-d in child cluster 310b, but is allowed to reach parent cluster 318a substantially only by way of interconnect 314a and not on other interconnects 314b-d. Looping is prevented by parent cluster 310a or, more specifically, each node which controls an interconnect 314a-d, being aware that the message was received by way of an interconnect 314a-d, and preventing the message from returning on any interconnect 314a-d.

Figure 3D:
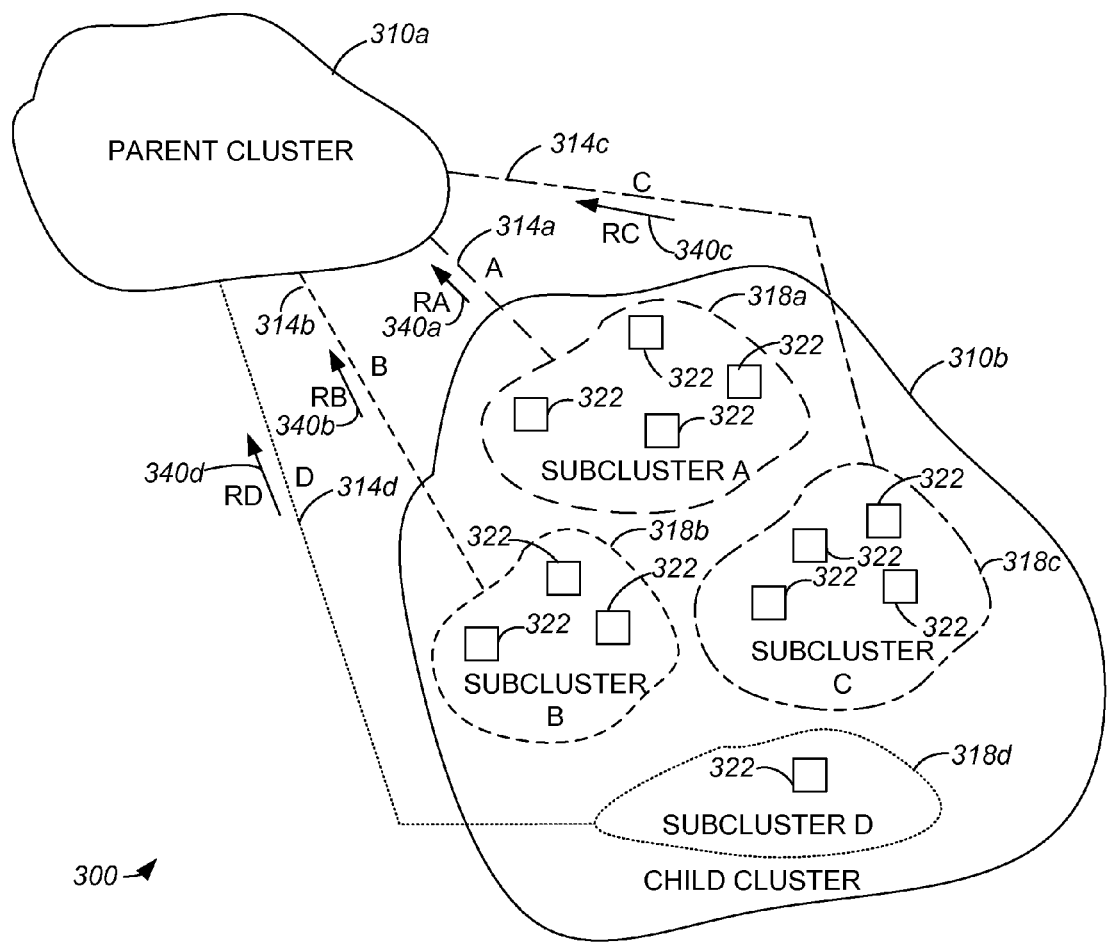
FIG. 3D is a diagrammatic representation of each subcluster of a child cluster, i.e., child cluster 310b of FIG. 3C, broadcasting separate messages to a parent cluster, i.e., parent cluster 310a of FIG. 3C, over specific interconnecting links in accordance with an embodiment of the present invention.

FIG. 3D is a diagrammatic representation of each subcluster 318a-d broadcasting messages to parent cluster 310a associated interconnects 314a-d, respectively, in accordance with an embodiment of the present invention. When subcluster 318a or, more specifically, a node 322 associated with subcluster 318a, broadcasts a message 340a to parent cluster 310a, message 340a is substantially only sent on interconnect 314a. Message 340a is not sent to parent cluster 310a over interconnects 314b-d. When a node in subcluster 318b broadcasts a message 340b to parent cluster 310a, message 340b is broadcast substantially only on interconnect 314b. Similarly, a message from subcluster 318c is broadcast to parent cluster 310a substantially only on interconnect 314c, and a message from subcluster 318d is broadcast to parent cluster 310a substantially only on interconnect 314d.

Figure 4A:
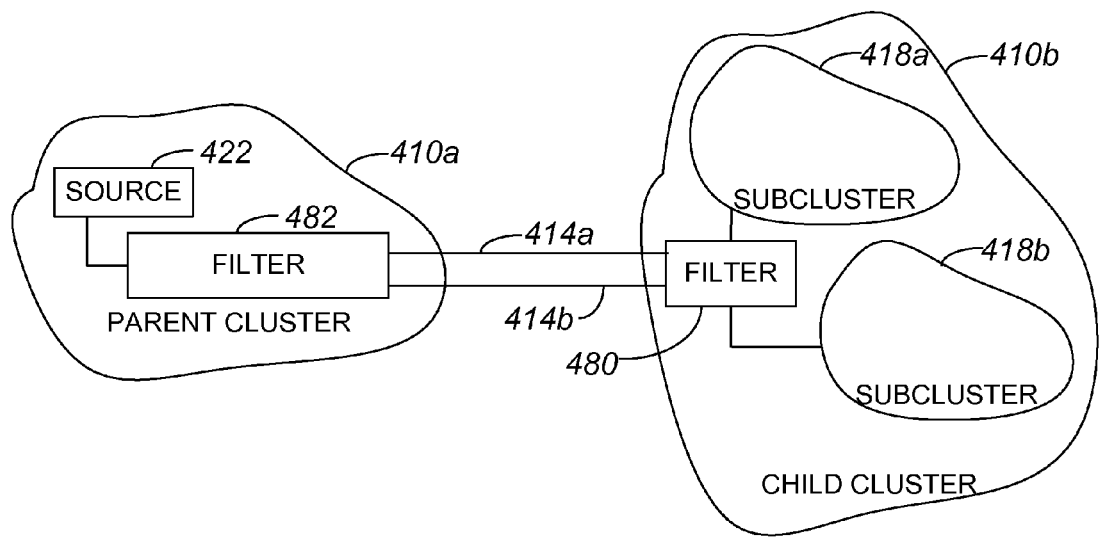
FIG. 4A is a diagrammatic representation of a parent cluster with a filter and a child cluster with a filter in accordance with an embodiment of the present invention.

To control communication between clusters 310a, 310b, and to enable subclusters 318a-d to be associated with particular interconnects 314a-d, filters may be implemented. Each interconnect 314a-d supports the ability to filter communications to and from the child cluster 310b. FIG. 4A is a diagrammatic representation of a parent cluster with a filter and a child cluster with a filter in accordance with an embodiment of the present invention. A parent cluster 410a is in communication with a child cluster 410b over interconnects 414a, 414b. Child cluster 410b includes two subclusters 418a, 418b of nodes (not shown). Parent cluster 410 includes at least one node 422 which, in the described embodiment, is arranged to broadcast a message to child cluster 410b.

A subcluster filter arrangement 480 is arranged to be bi-directional, and to filter both signals transmitted and received between interconnects 414a, 414b and child cluster 410b. Typically, subcluster filter arrangement 480 has filter function that is distributed to nodes (not shown) that are attached to an interconnect. Subcluster filter arrangement 480 may be implemented as code devices, e.g., computer code that executes on a processor of a computing system, or as hardware, e.g., as a part of a line card. When subcluster filter arrangement 480 is in an enabled state, substantially all incoming communications from parent cluster 410a that are not locally defined in a subclusters 418a, 418b are blocked from being received by subclusters 418a, 418b. By way of example, if node 422 sources a unicast message that is intended for subcluster 418b, a filter arrangement 482 of parent cluster 410a may send the unicast message on interconnect 414b, and subcluster filter arrangement 480 may make certain that subcluster 418b receives the unicast message while subcluster 418a does not. Filter arrangement 482 may be arranged such that interconnects 414a, 414b may identify which subcluster 418a, 418b contains a node (not shown) that sourced a message to be sent to parent cluster 410a. Identifying which subcluster 418a, 418b a message was sourced from prevents the message from being sent back to the subcluster 418a, 418b, i.e., loops may be prevented.

Figure 4B:
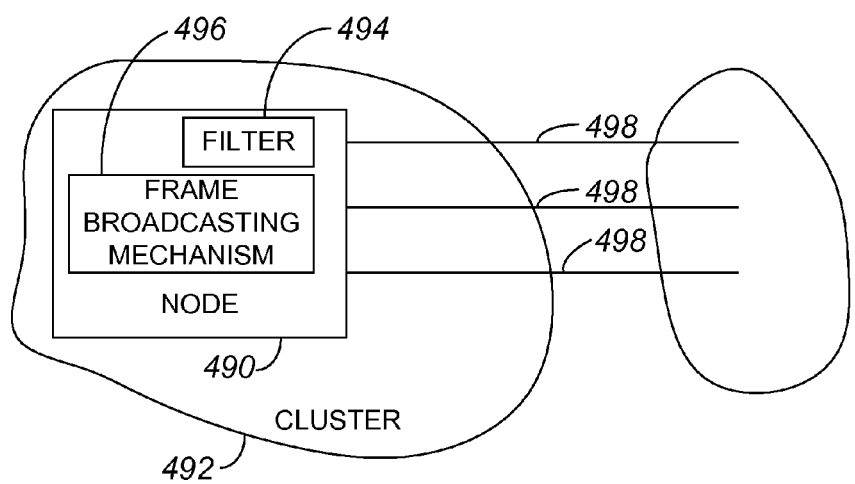
FIG. 4B is a diagrammatic representation of a node with a filter and frame broadcasting mechanism in accordance with an embodiment of the present invention.

In one embodiment, a filter arrangement such as filter arrangement 480 or 482 may be included in a node, e.g., a node that is in a child cluster 410b or a parent cluster 410a. That is, filter functionality may be distributed to each node attached to an interconnect such that a single point of failure is effectively eliminated. As shown in FIG. 4B, a node 490 that is a part of a cluster 492 may include a filter 494 and a frame broadcasting mechanism 496 that is arranged to broadcast a frame on at least one interconnect 498.

Figure 5:
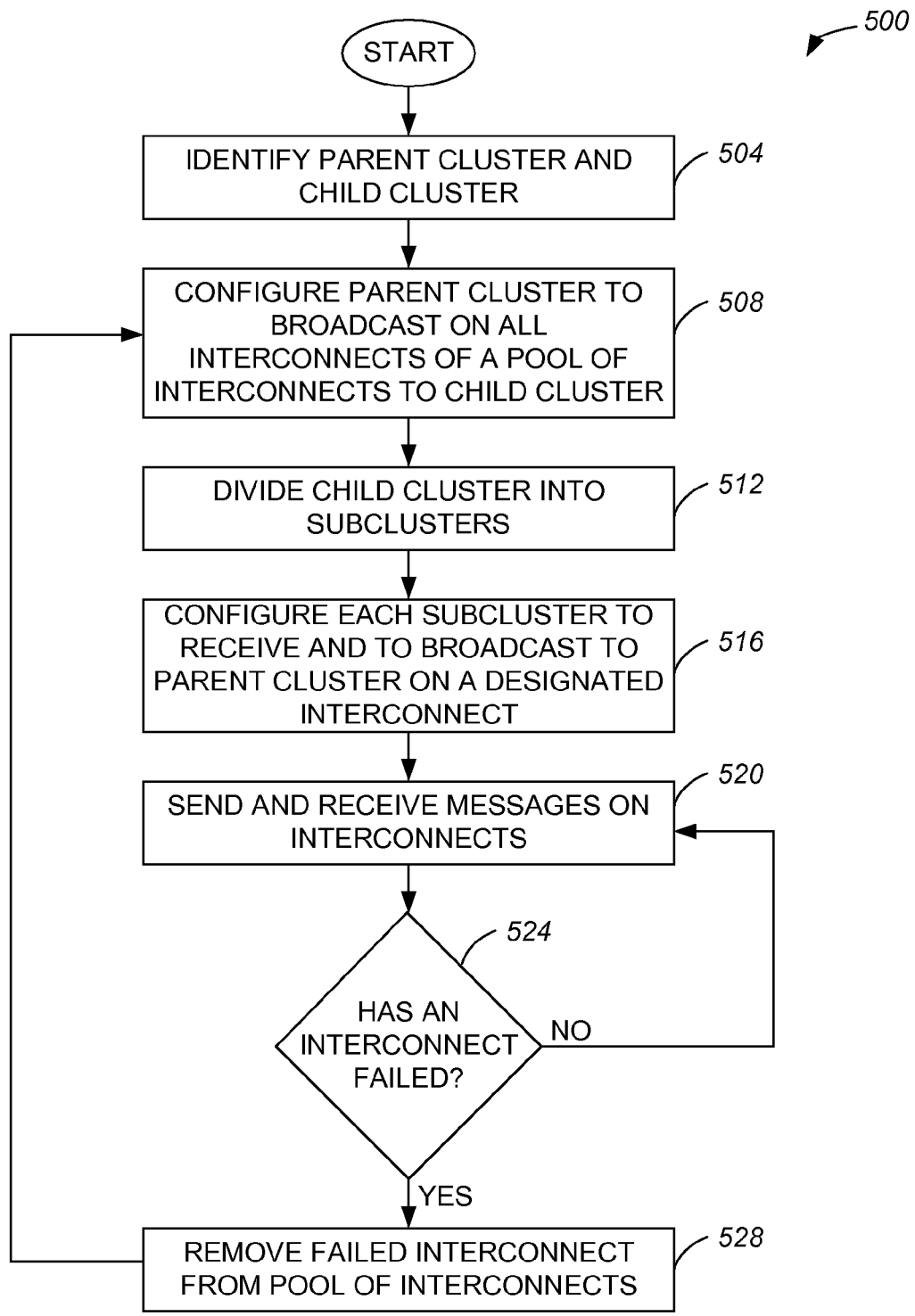
FIG. 5 is a process flow diagram which illustrates one method of configuring a network to have a designated parent cluster and a designated child cluster in accordance with an embodiment of the present invention.

With reference to FIG. 5, one method of configuring an interconnect group and communicating within the interconnect group will be described in accordance with an embodiment of the present invention. A process 500 of configuring an interconnect group of a network begins at step 504 in which a parent cluster and a child cluster are identified. In one embodiment, the parent cluster and the child cluster are resilient packet rings that are in communication over at least one interconnect. Once a parent cluster and a child cluster are identified, the parent cluster is configured to broadcast to the child cluster on substantially all interconnects of a pool of available, or working, interconnects in step 508. That is, the parent cluster is arranged such that when the parent cluster broadcasts a message to the child cluster, the message is broadcast on substantially all available interconnects between the parent cluster and the child cluster. A network administrator or software may configure nodes or devices within the parent cluster to broadcast messages on substantially all available interconnects.

In step 512, the child cluster is configured and divided into subclusters. Dividing the child cluster into subclusters may include, but is not limited to, grouping nodes in the child cluster according to geographic location, or identifying traffic demands and grouping nodes into subclusters accordingly. After the child cluster is divided into subclusters, each subcluster is configured in step 516 to receive messages and to broadcast messages on a designated interconnect. In one embodiment, each subcluster is assigned an interconnect that the subcluster uses to receive and to broadcast messages. In general, each interconnect of a pool of available interconnects is assigned to a single subcluster.

From step 516, process flow moves to step 520 in which messages, e.g., broadcast or unicast, are sent and received on the interconnects. A determination is made in step 524 as to whether any of the interconnects has failed or is otherwise unavailable for use in transporting messages between the parent cluster and the child cluster. If it is determined that no interconnects have failed, process flow returns to step 520 in which messages are transported across the interconnects. Alternatively, if it is determined in step 524 that an interconnect has failed, then in step 528, the failed interconnect is removed from the pool of available interconnects. Once the failed interconnect is removed from the pool of available interconnects, process flow returns to step 508 in which the parent cluster is effectively reconfigured to broadcast on all remaining interconnects in the pool of available interconnects. In one embodiment, reconfiguring a system after a failed interconnect has been detected may take less than approximately fifty milliseconds (ms).

Figure 6:
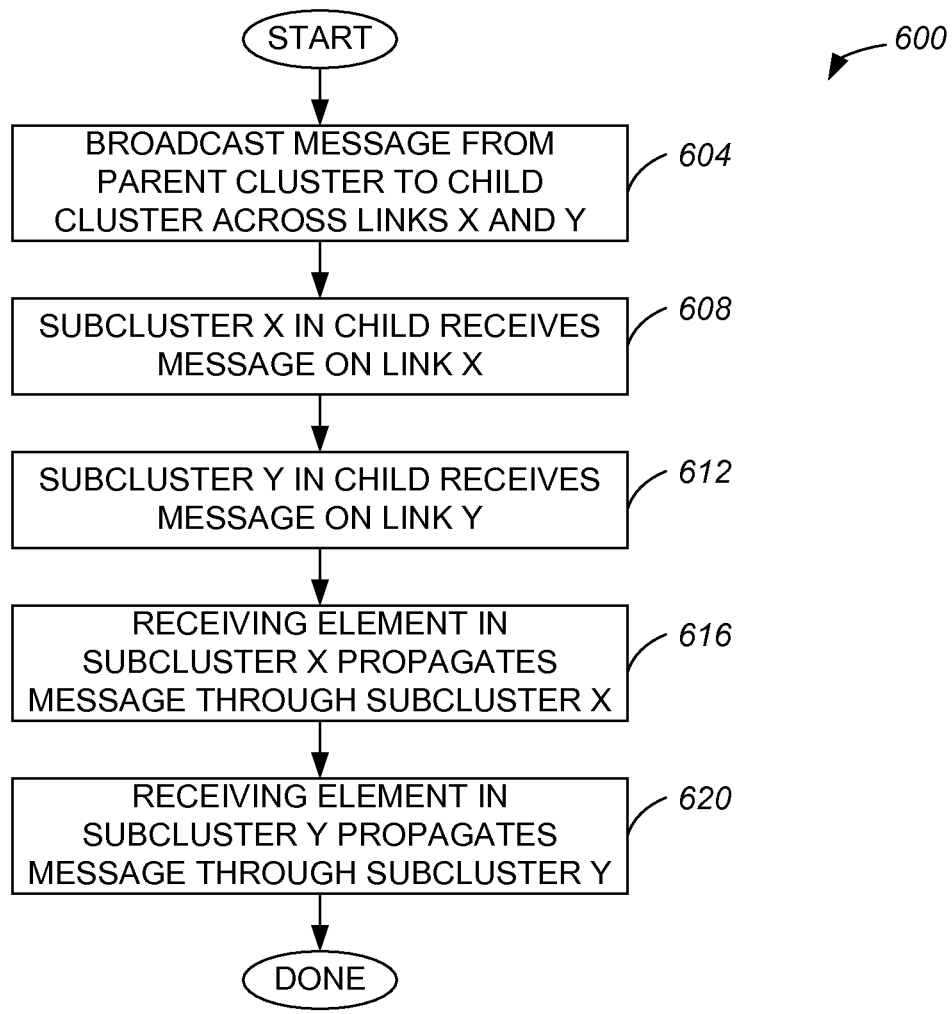
FIG. 6 is a process flow diagram which illustrates one method of processing a message sent from a parent cluster to a child cluster via links associated with subclusters in accordance with an embodiment of the present invention.

Broadcasting messages from a parent cluster to a child cluster, as mentioned above, involves broadcasting messages on substantially all available interconnects or links between the parent cluster and the child cluster. FIG. 6 is a process flow diagram which illustrates one method of processing a message sent from a parent cluster to a child cluster via interconnects effectively assigned to subclusters in accordance with an embodiment of the present invention. A process 600 of processing a message begins at step 604 in which a message is broadcast from a parent cluster to a child cluster across interconnects, e.g., link X and link Y. In the described embodiment, a pool of available interconnects between the parent cluster and the child cluster includes link X and link Y.

Subcluster X, which is part of the child cluster, receives the broadcasted message on link X in step 608. It should be appreciated that link X is the interconnect assigned to subcluster X. Similarly, subcluster Y, which is also part of the child cluster, receives the broadcasted message on link Y in step 612. Subcluster X and subcluster Y may receive the broadcasted message at approximately the same time, or at slightly different times in the event that one subcluster is at a greater distance from the parent cluster than the other subcluster.

Upon receiving the broadcasted message, the receiving node or element in subcluster X propagates the message through subcluster X in step 620. In other words, the node which receives the broadcasted message on link X effectively broadcasts the message to other nodes, if any, within subcluster X. In step 620, the receiving node or element in subcluster Y propagates the message through subcluster Y. Generally, in spatial balancing, a frame may flow through substantially only those nodes that belong to a subcluster of a parent interconnect when the frame is being sent from the parent to a child. However, in logical balancing, a frame may flow through substantially all nodes in all subclusters, but may be ignored by nodes that do not belong to the subcluster on which the frame was received. Once the broadcasted message has been received and passed through subcluster X and subcluster Y, the process of processing a message is completed. It should be appreciated that the broadcasted message may, in some instances, be broadcasted through other interconnects to other clusters until all clusters that are intended to receive the message actually receive the message.

Figure 7:
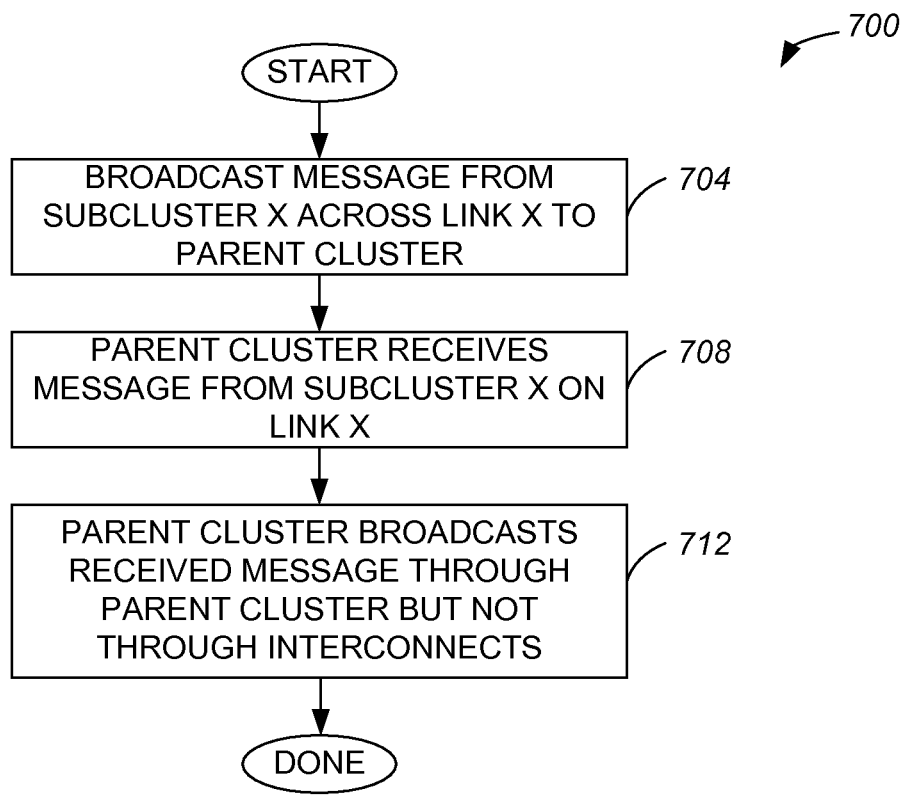
FIG. 7 is a process flow diagram which illustrates one method of sending a message from a child cluster to a parent cluster via a link associated with a subcluster in accordance with an embodiment of the present invention.

When a subcluster broadcasts a message to a parent cluster, the message is broadcast on the interconnect between the subcluster and the parent cluster. Referring next to FIG. 7, one method of processing a message that is broadcast from a subcluster to a parent cluster will be described in accordance with an embodiment of the present invention. A process 700 of processing a message broadcast from a subcluster to a parent cluster begins at step 704 in which a message is broadcast from subcluster X across an associated interconnect, e.g., link X, to the parent cluster. In the described embodiment, the message is substantially only broadcast on link X. After the broadcast message is sent on link X, the parent cluster receives the message on link X in step 708. Once the message is received, the parent cluster broadcasts the received message in step 712 throughout the parent cluster, but not through any interconnects. In general, the parent cluster may determine that if any matched nodes of the parent cluster received the message from a child cluster, the message is not to be forwarded back to the child cluster from which the message was received. That is, a frame is broadcast such that it does not return to the child cluster that sent the frame. Upon broadcasting the receive message throughout the parent cluster, the process of processing a message that is broadcast from a subcluster is completed.

Figure 8A:
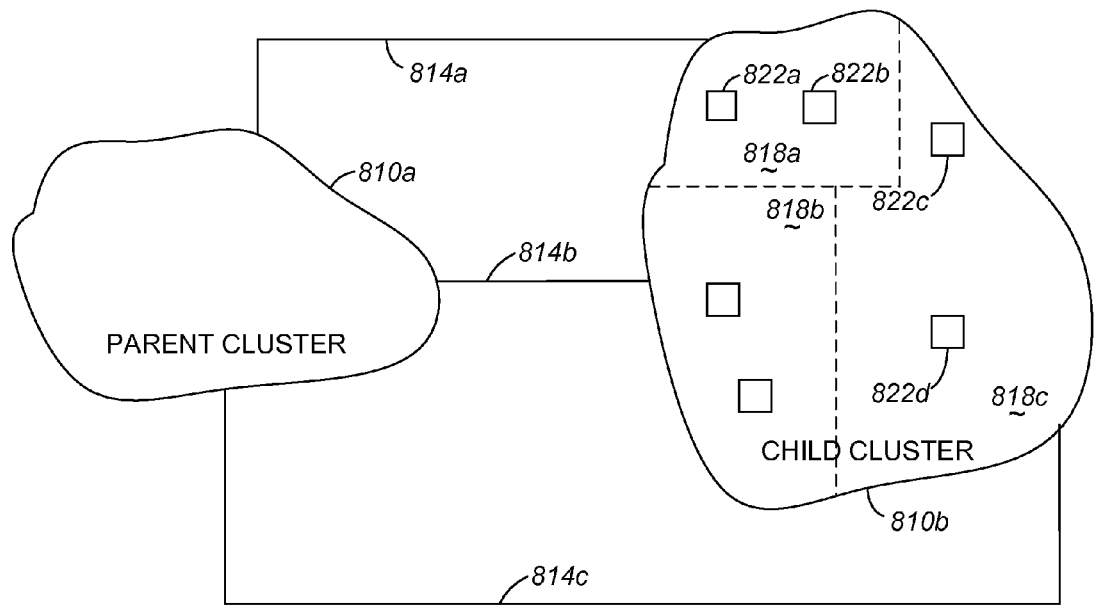
FIG. 8A is a diagrammatic representation of network in which a child cluster is divided into subclusters based on the physical location of nodes in accordance with an embodiment of the present invention.

In general, subclusters may be determined using any suitable method. Suitable methods, as previously mentioned, include, but are not limited to, allocating nodes to subclusters based on physical location and allocating nodes to subclusters based on traffic to the nodes. With reference to FIG. 8A, the allocation of nodes to subclusters based on physical location will be described in accordance with an embodiment of the present invention. An interconnect system 800 includes a parent cluster 810a that is in communication with a child cluster 810b over interconnects 814a-c. Each subcluster 818a-c may be defined to include nodes 822 that are in physical proximity to each other and to an appropriate interconnect 814a-c. For example, nodes 822a, 822b may be allocated to subcluster 818a if nodes 822a, 822b are in proximity to each other and to interconnect 814a. Similarly, nodes 822c, 822d may be allocated to subcluster 818*c* if nodes 822*c*, 822*d* are in proximity to each other and to interconnect 814*c*.

Figure 8B:
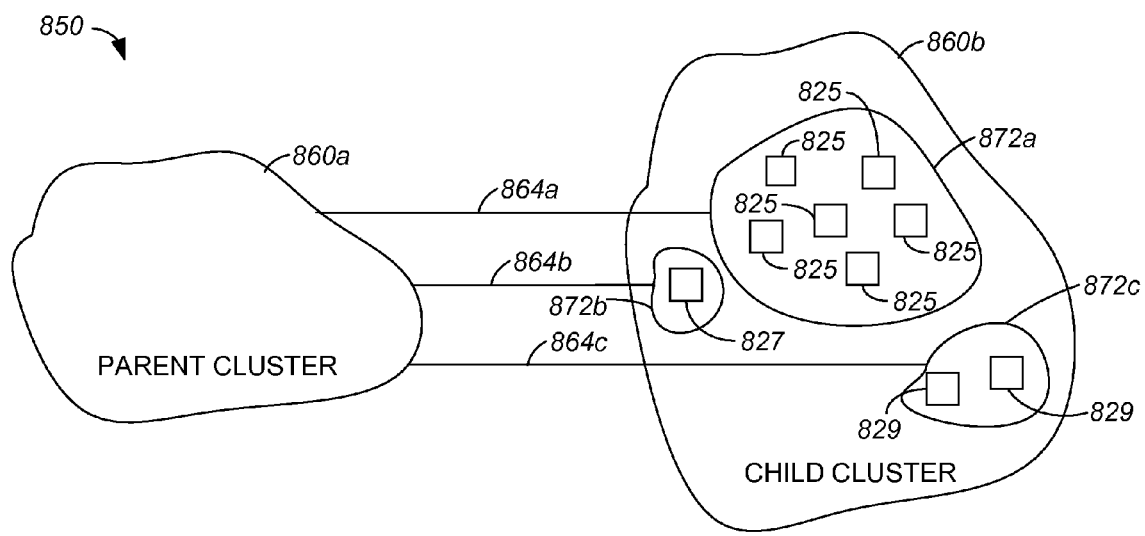
FIG. 8B is a diagrammatic representation of a network in which a child cluster is divided into subclusters based on traffic distribution in accordance with an embodiment of the present invention.

Alternatively, in lieu of allocating nodes to subclusters based on physical location, nodes may be allocated to subclusters such that the traffic on interconnects is relatively evenly divided. That is, nodes may be assigned to subclusters such that each subcluster in a child cluster is associated with approximately the same amount of traffic. FIG. 8B is a diagrammatic representation of a network in which a child cluster is divided into subclusters based on traffic distribution in accordance with an embodiment of the present invention. Within an interconnect system 850, a parent cluster 860*a* is interconnected with a child cluster 860*b* across interconnects 864*a-c*. Traffic associated with nodes 825, 827, 829 may be such that the majority of traffic is associated with a single node 827. Hence, node 827 may be assigned as the only node in a subcluster 872*b* and, hence, the only node 827 included cluster 860*b* that utilizes interconnect 864*b*. Other nodes 825, 829 may be divided such that nodes 825 are included in a subcluster 872*a* and nodes 829 are included in subcluster 872*c*. In the described embodiment, traffic associated with all nodes 825 is approximately the same as the traffic associated with node 827, and also approximately the same as traffic associated with all nodes 829. Therefore, interconnects 864*a-c* are each arranged to carry substantially the same traffic load.

It should be understood that subclusters 872*a-c* may be redefined at substantially any time. As the assignment of nodes to subclusters 872*a-c* is dynamic, when traffic distribution changes, subclusters 872*a-c* may be redefined to once again relatively evenly distribute traffic among subclusters 872*a-c*. Redefining subclusters 872*a-c* typically involves reallocating nodes 825, 827, 829 to subclusters 872*a-c*.

Generally, subclusters may also be redefined or reconfigured when an interconnect has failed, as mentioned above with respect to FIG. 5. In one embodiment, a failed interconnect is associated with a subcluster that is empty. Hence, when an interconnect is identified as faulty or failed, any nodes in the subcluster associated with the interconnect are disassociated from the interconnect. Typically, to maintain good performance within an interconnect group, nodes originally in a subcluster for which an interconnect is identified as faulty are relatively evenly allocated among other subclusters in a child cluster. Alternatively, in lieu of reallocating the nodes of a subcluster with a failed interconnect to other subclusters, completely new subclusters may be defined.

In one embodiment, two methods may be used to balance traffic between a parent cluster and a child cluster while effectively preventing replication of messages transmitted therebetween. Balancing traffic generally involves load sharing with a goal, for example, to ensure use of substantially all bandwidth in a ring. Bandwidth may be efficiently allocated by balancing traffic such that traffic flows substantially only to those nodes within a community of interest, such that bandwidth is not wasted on nodes that are not within the community of interest. Two possible methods used to balance traffic over interconnects are a spatial balancing method and a logical balancing method. Spatial balancing generally involves two nodes forwarding traffic based on topology of a network. Logical balancing generally involves each interconnect for subsets of logically identified communication, for example, communication of specifica virtual local area networks (VLANs). Logical balancing substantially requires the identification of subclusters based on logical communication attributes such as VLAN association, and may involve independent identification of subclusters for each logical communication type, as long as the identification effectively prevents a single message coming from a parent cluster from being received more than once by nodes in a child cluster.

Figure 9:
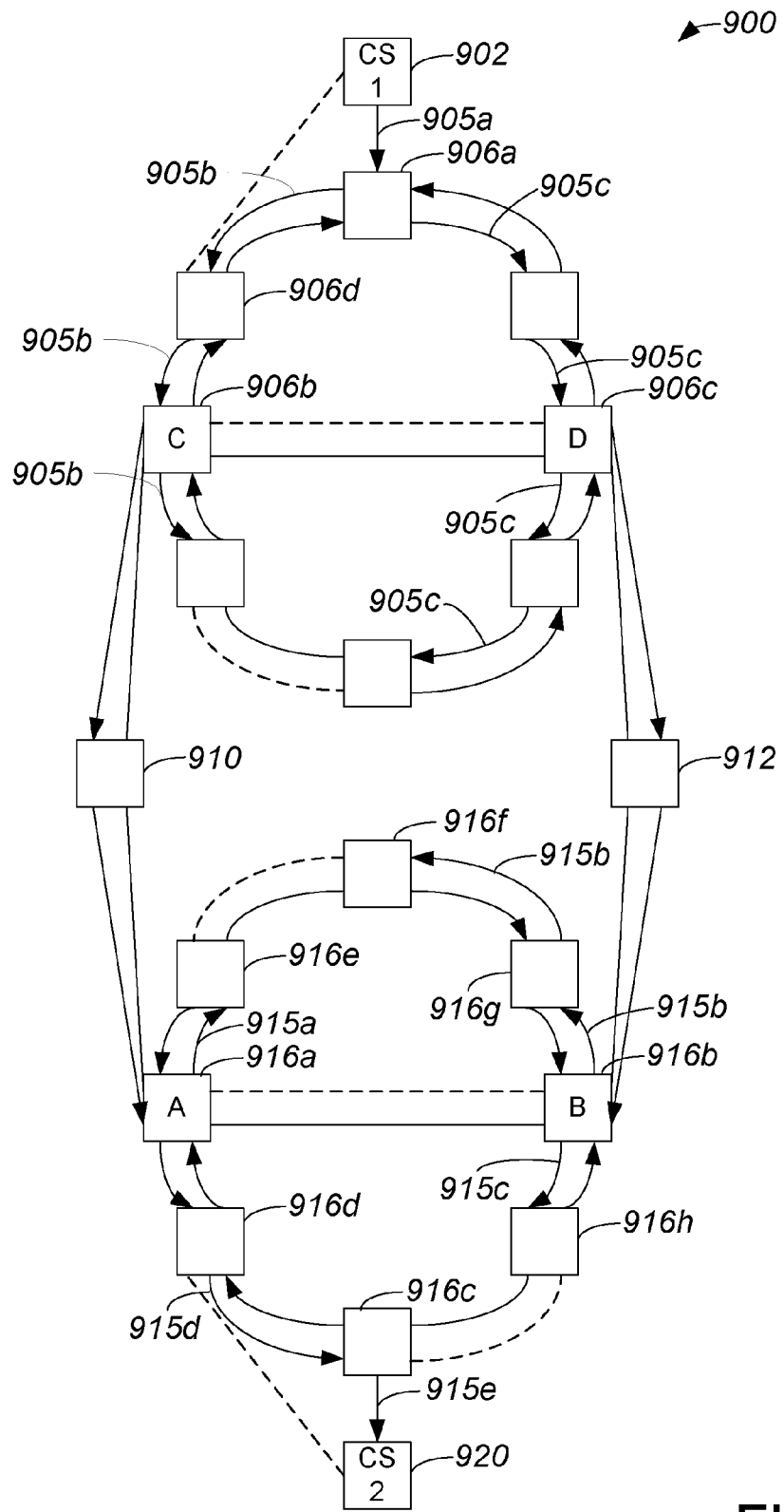
FIG. 9 is a diagrammatic representation of a network in which traffic is routed using spatial balancing in accordance with an embodiment of the present invention.

FIG. 9 is a diagrammatic representation of a network in which traffic is routed using spatial balancing in accordance with an embodiment of the present invention. In a network 900, e.g., a bridged network or an RPR network, a node 902 may send a frame that is destined for a node 920. Node 902 may generally be a first customer site node, while node 920 may generally be a second customer site node.

A frame is sent from node 902 via a path segment 905*a* to a node 906*a* which forwards the frame on paths 905*b*, 905*c*. Once the frame reaches nodes 906*b*, 906*c*, the frame is forward on interconnects 910, 912 to nodes 916*a*, 916*b*. In the described embodiment, nodes 906*b*, 906*c* may be included in a parent cluster while nodes 916*a*, 916*b* may be included in a child cluster. Node 916*a* forwards the frame on paths 915*a*, 915*d*, while node 916*b* forwards the frame on paths 915*b*, 915*c*. If nodes 916*a*, 916*b* are included in a child cluster, then node 916*a* and nodes 916*c-e* may be a part of one subcluster while node 916*b* and nodes 916*f-h* are a part of another subcluster. Node 916*c* provides the frame on a path segment 915*e* to node 920.

At a first level, node 906*a* forwards the frame received from node 902, i.e., a single matched node forwards the frame. It should be appreciated that nodes 906*b*, 906*c* may be considered to be matched nodes. Nodes 916*a*, 916*b* may also be considered to be matched nodes. Flood scoping prevents replication of the frame, while bi-directional flooding allows the shortest path to be realized.

Figure 10:
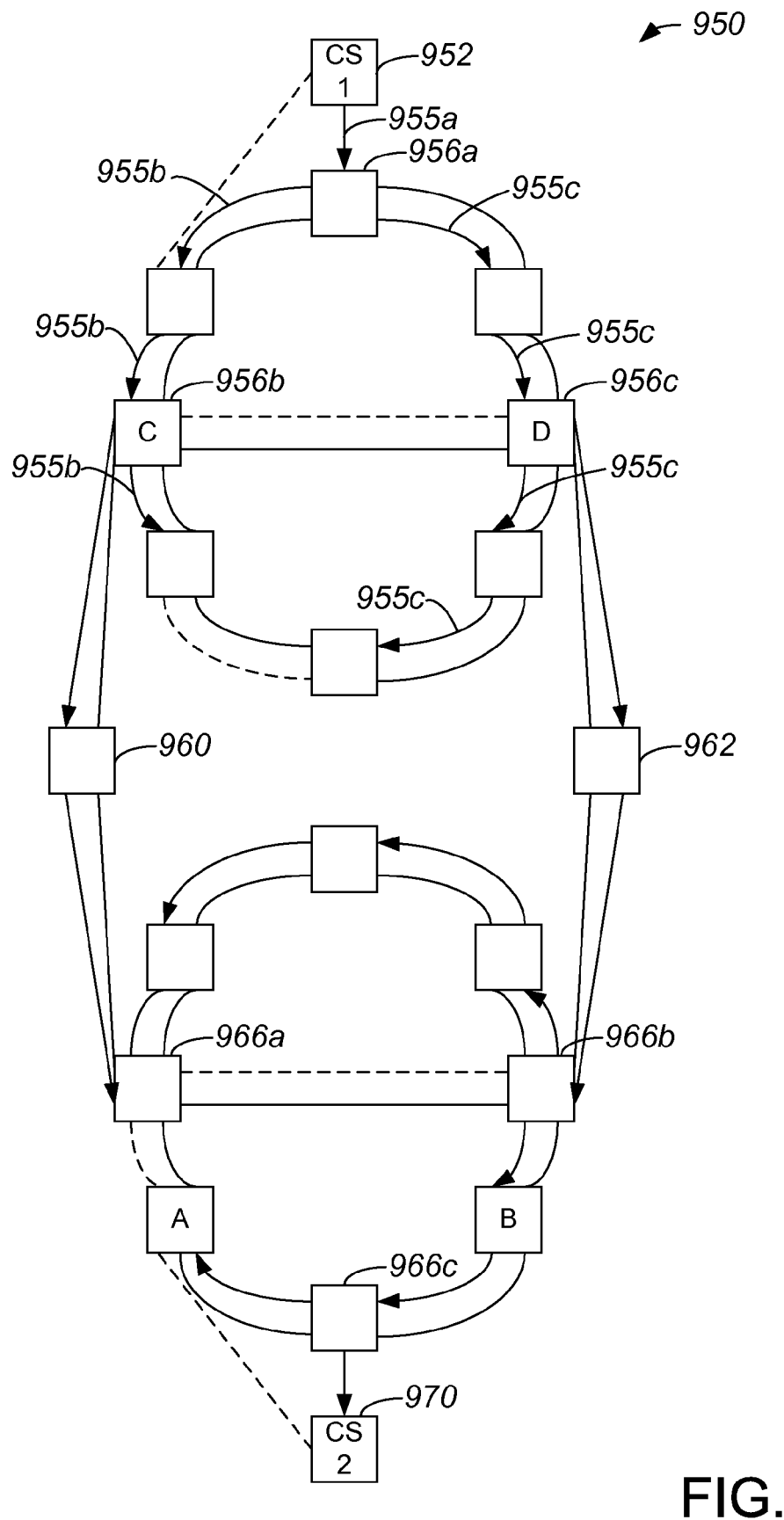
FIG. 10 is a diagrammatic representation of a network in which traffic is routed using virtual local area network (VLAN) balancing in accordance with an embodiment of the present invention.

With respect to FIG. 10, VLAN balancing will be described in accordance with an embodiment of the present invention. FIG. 10 is a diagrammatic representation of a network in which traffic is routed using virtual local area network (VLAN) balancing. Within a network 950, a customer site node 952 may forward a frame 955*a* to a node 956*a* that propagates the frame to its associated nodes on pats 955*b*, 955*c*. When the frame reaches nodes 956*b*, 956*c*, the frame is provided via interconnects 960, 962 to nodes 966*a*, 966*b*, respectively. Matched nodes 966*a*, 966*b*, which may be considered to be associated with a child cluster, filter the frame such that only one of matched node 966*a*, 966*b* forwards the frame. Each node 966*a*, 966*b* may be associated with a VLAN, and filters frames based on the VLANS. It should be appreciated that filtering may be associated with either a parent process or a child process, or both. However, in the described embodiment, filtering functionality is provided by a child cluster. As shown, load balancing is such that node 966*b* forwards the frame while node 966*a* does not. Once a node 966*c* receives the frame, the frame is provided to customer site 970.

Although only a few embodiments of the present invention have been described, it should be understood that the present invention may be embodied in many other specific forms without departing from the spirit or the scope of the present invention. By way of example, although nodes may generally be complaint with the IEEE 802.17 standard, nodes may not necessarily be associated with RPR. In other words, the present invention may be implemented with regards to clusters that are not RPR. Hence, though the present invention has generally been described as being suitable for use in forwarding with respect to layer two ring technology in a networking framework defined by the Open Systems Interconnection (OSI) model, the present invention may be generalized for forwarding in layer three as defined by the OSI model.

When links or nodes within a cluster fail, communication between nodes within the cluster may be lost. As will be appreciated by those skilled in the art, a cluster may use protection schemes to allow communications within the cluster to occur even in light of a failed link or node. Protection schemes may include, but are not limited to, schemes involving 1+1 protection, unidirectional path switched rings, and bidirectional path switched rings.

In general, nodes or devices in clusters may be any suitable network element. Suitable network elements include, but are not limited to, switches, database systems, and computing systems. As will be appreciated by those skilled in the art, computing systems may include processors, memories, input/output devices, and display devices.

The identification of clusters of nodes within a network and substantially all interconnects between clusters may be accomplished by a network administrator. Alternatively, the identification of clusters and interconnects may be accomplished by network-wide topology aware software without departing from the spirit or the scope of the present invention.

The present invention describes a method of preventing communication loops between a pair of clusters with multiple balanced interconnects. It should be understood that, in general, networks may be divided into more than two clusters, and that the present invention may be modified for use in such networks. Messages originating in, or entering, a cluster may propagate to substantially all interconnected clusters, and may continue to propagate, e.g., following interconnect and subcluster filtering rules. A message received from a child cluster may be propagated to substantially all interconnected clusters, but not back to the child cluster. A message received by a child subcluster may be propagated through substantially all interconnects which are associated with devices in the subcluster. Each subcluster may be responsible for propagating the message to interconnects associated with the subcluster. In general, a cluster may be a child of one cluster and a parent of another cluster. The methods of the present invention may be applied to substantially any network that has no cyclical communication paths which extend through three or more clusters.

While a parent cluster has generally been described as being associated with one child cluster, a parent cluster may be associated with more than one child cluster. As described above, each child cluster, is typically associated with a single parent cluster. It should be understood, however, that by providing functionality that would substantially prevent duplication of broadcasts, a child cluster may be associated with more than one parent cluster. In general, a cluster associated with more than one parent cluster provides a method to ensure that one and only one copy of each message is propagated to each parent. Because a message received from a parent is duplicated into each subcluster, a filter may be configured to propagate a single message from a child cluster to each parent cluster. Possible methods for performing such filtering may include, but are not limited to, interconnect filtering within a child cluster based on a source and destination parent cluster that would filter communication from one parent to another except via a single dynamically designated interconnect, or interconnect filtering that would enable communication from one parent to another over a plurality of balanced interconnects with a filtering method that effectively ensures that one and only one copy of each message is propagated to each parent.

The term "communication" as used above generally refers to bridged or routed packet-based communication. However, it should be appreciated that other forms of streaming non-packet communication may occur within and between clusters. Such other forms of streaming non-packet communication is typically bi-directional and arranged to support some form of broadcast to more than one device.

While interconnects have generally been described as separate entities, e.g., separate devices or separate Ethernet links, interconnects may be a part of a single entity. For example, a single device may effectively serve as multiple interconnects. In an embodiment in which one device is used to provide more than one interconnection between a parent cluster and a child cluster, each interconnection within the device may have an associated subcluster filter.

A message that travels from a parent cluster to a child cluster within an interconnect group is replicated by the parent cluster to each subcluster, and is broadcast substantially only within each subcluster. It should be appreciated, however, that a message that originates in a subcluster or enters a subcluster via a method other than an interconnect from a parent cluster is generally broadcast directly to the nodes in each of the subclusters of the child cluster, without passing through any interconnect associated with the interconnect group. Communication between devices or nodes in the same cluster generally occurs directly between the devices or the nodes, and not through another cluster.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

The invention claimed is:

1. A method comprising:
   at a node that is part of a first cluster of nodes arranged in a ring configuration in a network and configured to communicate with every other one of the nodes of the first cluster, broadcasting a first frame to a second cluster of nodes in the network on a plurality of point-to-point interconnects that are configured to carry broadcast and unicast communications and that are connected between the first cluster and the second cluster;
   at the node that is part of the first cluster, receiving from a node in the second cluster a second frame on a first interconnect of the plurality of interconnects;
   broadcasting the second frame to nodes within the first cluster;
   at nodes in the first cluster, recognizing the first interconnect of the plurality of interconnects and that the second frame is a received frame; and
   at nodes in the first cluster that control a corresponding one of the plurality of interconnects and which receive the second frame, blocking the second frame from being returned to the second cluster from the first cluster on any of the plurality of interconnects after broadcasting the second frame to nodes within the first cluster and recognizing the first interconnect of the plurality of interconnects.

2. The method of claim 1, and further comprising at a node in the second cluster that receives the first frame, broadcasting the first frame directly to nodes in a subcluster of nodes within the second cluster over one of the interconnects.

3. The method of claim 1, and further comprising broadcasting the second frame received from a node in a particular subcluster of nodes of a plurality of subclusters of nodes within the first cluster to remaining plurality of subclusters within the first cluster.

4. The method of claim 1, further comprising:
   determining if one of the plurality of interconnects has failed; and if it is determined that one of the plurality of interconnects has failed, removing the failed interconnect as an available interconnect for communications between the first cluster and the second cluster and reallocating the remaining interconnects.

5. A system comprising:
a plurality of nodes arranged in a ring configuration in a cluster within a network; and
a plurality of interconnects configured to connect the cluster to a corresponding one of a plurality of subclusters of nodes in an other cluster of nodes in the network, wherein the plurality of interconnects are configured to carry broadcast and unicast communications between nodes in the cluster and nodes in the other cluster to receive messages at nodes in the cluster from nodes in the other cluster and to send messages from the nodes in the cluster to nodes in the other cluster, wherein the plurality of interconnects are configured to receive a frame broadcast to nodes within the cluster from the other cluster; and
wherein nodes of the cluster that are configured to control corresponding interconnects are configured to determine and recognize one of the plurality of interconnects on which the frame was transmitted from the other cluster to the cluster and to block the frame from being returned back to the other cluster on any one of the plurality of interconnects once the nodes of the cluster determine that the frame originated on one of the plurality of interconnects.

6. The system of claim 5, wherein the plurality of nodes in the cluster are configured as a resilient packet ring.

7. The system of claim 5, wherein the plurality of interconnects includes an Ethernet channel.

8. The method of claim 1, and further comprising:
sending a first unicast message on one of the plurality of interconnects from the node that is part of the first cluster to a filter device in the second cluster;
receiving at a filter device in the first cluster a second unicast message from a node in the second cluster that is intended to be delivered to a node in a particular subcluster of nodes within the first cluster;
identifying the intended node of the particular subcluster of nodes; and
directing the unicast message from the filter device in the first cluster to the identified intended node of the particular subcluster and not to any other nodes of subclusters within the first cluster.

9. The method of claim 1, and further comprising:
receiving at a filter device in the first cluster a message from a particular subcluster of a plurality of subclusters in the first cluster;
determining at the filter device which of the plurality of interconnects the message was sent over to reach the filter device in the first cluster;
identifying that the message was sourced from the particular subcluster based on the determining; and
blocking the message at the filter device in the first cluster from being sent back to the particular subcluster.

10. The method of claim 1, and further comprising sending messages from nodes in corresponding ones of a plurality of subclusters of nodes in the first cluster via an associated one of the plurality of interconnects and receiving messages from nodes in the first cluster intended for nodes in corresponding subclusters in the first cluster via an associated one of the plurality of interconnects.

11. A system comprising:
a first cluster of nodes in a network comprising a plurality of subclusters each of which comprises one or more nodes;
a second cluster of nodes in the network in a ring configuration; and
a plurality of interconnects between the first cluster and the second cluster, wherein the interconnects are configured to carry broadcast and unicast communications;
wherein each of the interconnects is designated to send messages to and receive messages from one or more nodes in a corresponding subcluster;
wherein the plurality of interconnects are configured to receive a first frame broadcast to the plurality of interconnects from one or more nodes in the first cluster and to send the frame to one or more nodes in the second cluster, and to receive a second frame broadcast from one or more nodes in the second cluster to a particular subcluster of the first cluster on a particular interconnect that is dedicated to the particular subcluster; and
wherein nodes in the first cluster which are configured to control a corresponding one of the plurality of interconnects are configured to recognize particular interconnects that receive the first frame and the second frame and to block the second frame from being returned to the second cluster from the first cluster on any of the plurality of interconnects.

12. The system of claim 11, wherein nodes in the second cluster that receive the first frame are configured to broadcast the first frame directly to nodes in their subcluster over one of the interconnects.

13. The system of claim 11, wherein nodes in the first cluster that receive the second frame are configured to broadcast the second frame to nodes within their corresponding subclusters.

14. The system of claim 11, and further comprising a filter device in the first cluster, wherein the filter device is configured to:
receive a message from the second cluster;
determine which of multiple interconnects of the plurality of interconnects the message was sent over to reach the filter device in the first cluster; and
block the message at the filter device in the first cluster from being sent back to the second cluster.

15. The method of claim 1, further comprising receiving from a plurality of nodes in the second cluster a plurality of frames on more than one of the plurality of interconnects.

16. The method of claim 4, wherein reallocating comprises reallocating the plurality of interconnects that have not failed to the nodes of the first cluster and second cluster that correspond to the one of the plurality of interconnects that has failed.

17. The method of claim 16, further comprising load balancing the plurality of frames across the plurality of interconnects such that the plurality of frames are received only at nodes of interest in the first cluster.

18. The method of claim 16, further comprising identifying subclusters of nodes of the first cluster based on logical communication attributes and forwarding the frames by two or more nodes to the identified subclusters of nodes of the first cluster.

19. The method of claim 17, further comprising forwarding the plurality of frames by two or more nodes in the first cluster to remaining nodes in the first cluster based on network topology.

20. The method of claim 19, wherein forwarding comprises identifying network topology based on specific virtual local area networks (VLANs).

21. The method of claim 2, further comprising broadcasting the first frame to multiple subclusters of nodes within the first cluster on the interconnects such that each one of the interconnects is associated with a particular one of the multiple subcluster of nodes within the first cluster.

22. The method of claim 1, wherein broadcasting the first frame comprises broadcasting the first frame to the second cluster on all of the plurality of interconnects between the first cluster and the second cluster of nodes in the network such that the first frame is transmitted to multiple subclusters of nodes within the second cluster, wherein receiving the second frame at the first cluster comprises receiving the second frame that is broadcast on all of the plurality of interconnects to the first cluster, and wherein blocking comprises blocking the second frame from being returned to any of the subclusters of nodes in the second cluster from the first cluster on any of the plurality of interconnects.

* * * * *